United States Patent
Gadkaree et al.

(10) Patent No.: US 9,209,464 B2
(45) Date of Patent: Dec. 8, 2015

(54) CURRENT COLLECTORS HAVING TEXTURED COATING

(75) Inventors: Kishor Purushottam Gadkaree, Painted Post, NY (US); Felipe Miguel Joos, Painted Post, NY (US); James Robert Lim, Painted Post, NY (US); Kamjula Pattabhirami Reddy, Corning, NY (US); John Earl Tosch, Wellsburg, NY (US)

(73) Assignee: Corning Incorporated, Corning, NY (US)

( * ) Notice: Subject to any disclaimer, the term of this patent is extended or adjusted under 35 U.S.C. 154(b) by 705 days.

(21) Appl. No.: 12/566,147

(22) Filed: Sep. 24, 2009

(65) Prior Publication Data

US 2011/0070493 A1    Mar. 24, 2011

(51) Int. Cl.
*H01G 11/26* (2013.01)
*H01M 4/66* (2006.01)
*H01G 11/68* (2013.01)
*H01G 11/70* (2013.01)
*H01G 11/84* (2013.01)
*H01G 11/28* (2013.01)

(52) U.S. Cl.
CPC .............. *H01M 4/667* (2013.01); *H01G 11/28* (2013.01); *H01G 11/68* (2013.01); *H01G 11/70* (2013.01); *H01G 11/84* (2013.01); *H01M 4/661* (2013.01); *H01M 4/663* (2013.01); *Y02E 60/13* (2013.01); *Y02T 10/7022* (2013.01)

(58) Field of Classification Search
None
See application file for complete search history.

(56) References Cited

U.S. PATENT DOCUMENTS

| | | | |
|---|---|---|---|
| 5,248,572 A | 9/1993 | Shoji et al. | |
| 5,286,415 A | 2/1994 | Buckley et al. | 252/502 |
| 5,478,676 A | 12/1995 | Turi et al. | 429/234 |
| 5,849,371 A | 12/1998 | Beesley | 427/566 |
| 6,072,692 A * | 6/2000 | Hiratsuka et al. | 361/502 |
| 6,201,685 B1 | 3/2001 | Jerabek et al. | 361/502 |
| 6,212,062 B1 | 4/2001 | Day et al. | 361/502 |
| 6,304,426 B1 | 10/2001 | Wei et al. | 361/502 |
| 6,447,555 B1 | 9/2002 | Okamura et al. | 29/25.03 |
| 6,487,066 B1 | 11/2002 | Niiori et al. | 361/502 |
| 6,493,210 B2 | 12/2002 | Nonaka et al. | 361/502 |
| 6,565,701 B1 | 5/2003 | Jerabek et al. | 156/305 |
| 6,685,804 B1 | 2/2004 | Ikeda et al. | |
| 6,714,391 B2 | 3/2004 | Wilk et al. | 361/15 |
| 6,738,252 B2 | 5/2004 | Okamura et al. | 361/502 |
| 6,844,113 B2 | 1/2005 | Yagi et al. | |
| 6,887,511 B1 | 5/2005 | Shima et al. | |

(Continued)

FOREIGN PATENT DOCUMENTS

JP    1990098914    4/1990
JP    1991127811    5/1991

(Continued)

OTHER PUBLICATIONS

Machine translation of JP1990098914.

(Continued)

*Primary Examiner* — Maria J Laios
(74) *Attorney, Agent, or Firm* — John L. Haack (57) ABSTRACT

A current collector and an electric double layer capacitor including a current collector. The current collector has a conductive layer with an electrode-facing surface and an opposing second surface, each surface having an area, and a textured coating formed over and in contact with at least a majority of the electrode-facing surface.

27 Claims, 4 Drawing Sheets

(56) References Cited

U.S. PATENT DOCUMENTS

| | | |
|---|---|---|
| 7,095,603 B2 | 8/2006 | Mahon et al. ................. 361/502 |
| 7,139,162 B2 | 11/2006 | Michel et al. |
| 7,192,673 B1 | 3/2007 | Ikeda et al. |
| 7,195,842 B1 | 3/2007 | Fujimoto et al. |
| 7,206,190 B2 | 4/2007 | Murakami et al. ........... 361/502 |
| 7,235,330 B1 | 6/2007 | Fujimoto et al. |
| 7,241,533 B1 | 7/2007 | Ikeda et al. |
| 7,368,191 B2 * | 5/2008 | Andelman et al. ............ 429/523 |
| 7,382,602 B2 | 6/2008 | Sakata et al. ................. 361/502 |
| 7,385,801 B2 | 6/2008 | Ando et al. |
| 7,394,648 B2 | 7/2008 | Kondo et al. ................. 361/502 |
| 7,410,728 B1 | 8/2008 | Fujimoto et al. |
| 7,794,881 B1 | 9/2010 | Fujimoto et al. |
| 8,173,304 B2 | 5/2012 | Kami et al. |
| 2002/0167785 A1 | 11/2002 | Kamath ........................ 361/502 |
| 2004/0085710 A1 | 5/2004 | Takeuchi et al. .............. 361/502 |
| 2006/0035148 A1 * | 2/2006 | Balaya et al. ................. 429/218.1 |
| 2006/0203429 A1 | 9/2006 | Thrap et al. .................... 361/502 |
| 2006/0210874 A1 * | 9/2006 | Erhardt et al. ................. 429/209 |
| 2007/0247788 A1 * | 10/2007 | Sakata et al. .................. 361/523 |
| 2008/0248189 A1 | 10/2008 | Ohtsuka et al. ................ 427/58 |
| 2008/0254362 A1 | 10/2008 | Raffaelle et al. .............. 429/188 |
| 2009/0109599 A1 | 4/2009 | Gadkaree et al. ............. 361/502 |
| 2009/0109600 A1 | 4/2009 | Reddy et al. .................. 361/502 |

FOREIGN PATENT DOCUMENTS

| | | |
|---|---|---|
| JP | 1997320569 | 12/1997 |
| JP | 1999073947 | 3/1999 |
| JP | 2001351583 | 12/2001 |
| JP | 2005019795 | 1/2005 |
| JP | 2009043667 | 2/2008 |
| JP | 2008276553 | 11/2008 |
| JP | 2009295474 | 12/2009 |
| JP | 2010108971 | 5/2010 |
| JP | 2011003795 | 1/2011 |
| WO | 2007/116244 | 10/2007 |

OTHER PUBLICATIONS

Machine translation of JP 1991127811.
Machine translation of JP 1997320569.
Machine translation of JP 1999073947.
Machine translation of JP 2001351583.
Machine translation of JP 2005019795.
Machine translation of JP 2008276553.
Machine translation of JP 2009043667.
Machine translation of JP 2009295474.
Machine translation of JP 2010108971.
Machine translation of JP 2011003795.
JP2012-531048 List of references cited.

* cited by examiner

FIG. 5

CURRENT COLLECTORS HAVING TEXTURED COATING

BACKGROUND

Current collectors are used in a variety of devices, including electrochemical cells such as batteries and fuel cells, and capacitors such as electric double layer capacitors (EDLCs) and hybrid capacitors. It would be advantageous to provide current collectors that can be fabricated in an efficient manner and which improve the performance of such devices.

SUMMARY

A current collector comprises a conductive layer having an electrode-facing surface and an opposing second surface, each surface having an area, and a textured coating formed over and in contact with at least a majority of the area of the electrode-facing surface, wherein the textured coating comprises peaks and valleys.

A method of forming a current collector comprises providing a conductive layer having an electrode-facing surface and an opposing second surface, each surface having an area, and forming a textured coating having peaks and valleys over and in contact with at least a majority of the electrode-facing surface.

An electric double layer capacitor comprises a first current collector in electrical contact with a first electrode, a second current collector in electrical contact with a second electrode, a separator positioned between and in physical contact with each of the first electrode and the second electrode, and an electrolyte incorporated throughout the first electrode, the second electrode, and the separator, wherein at least one of the first current collector and the second current collector comprise a conductive layer having an electrode-facing surface and an opposing second surface, each surface having an area, and a textured coating comprising peaks and valleys formed over and in contact with at least a majority of the area of the electrode-facing surface.

A method of forming an EDLC assembly comprises providing a first conductive layer having an electrode-facing surface and an opposing second surface, each surface having an area, forming a first textured coating over and in physical contact with at least a majority of the electrode-facing surface of the first conductive layer, the first textured coating comprising peaks and valleys, forming a first electrode over and in substantially continuous physical contact with the first textured coating to form a first current collector-electrode assembly, forming a separator layer over and in physical contact with the first electrode, providing a second conductive layer having an electrode-facing surface and an opposing second surface, each having an area, forming a second textured coating over and in contact with at least a majority of the electrode-facing surface of the second conductive layer, wherein the second textured coating comprises peaks and valleys, forming a second electrode over and in substantially continuous physical contact with the second textured coating to form a second current collector-electrode assembly, and placing the second electrode over and in physical contact with the separator layer to form the EDLC assembly.

BRIEF DESCRIPTION OF THE DRAWINGS

The disclosure may be more completely understood in consideration of the following detailed description of various embodiments and in connection with the accompanying drawings, in which.

DETAILED DESCRIPTION

The disclosure relates to current collectors, methods of forming current collectors, and devices including such current collectors. Current collectors are used in numerous devices, including electrochemical cells such as batteries and fuel cells, and capacitors such as electric double layer capacitors (EDLC) and hybrid capacitors. A current collector generally functions to collect and/or distribute electrical current that is accumulated or transferred by an electrode.

A device that includes at least one current collector can be improved by lowering the interfacial resistance between the current collector and the electrode. Lowering the interfacial resistance of the current collector/electrode interface can lower the equivalent series resistance (ESR) of the device, which can in turn increase the power density. Practically, this allows fabrication of higher power devices.

Current collectors according to the various embodiments disclosed herein can provide improved interfacial resistances while simultaneously providing good adhesion between the electrode and the current collector. The simultaneous increase in interfacial conduction and adhesion is accomplished by the use of a current collector having at least one textured coating.

Figure 1A:
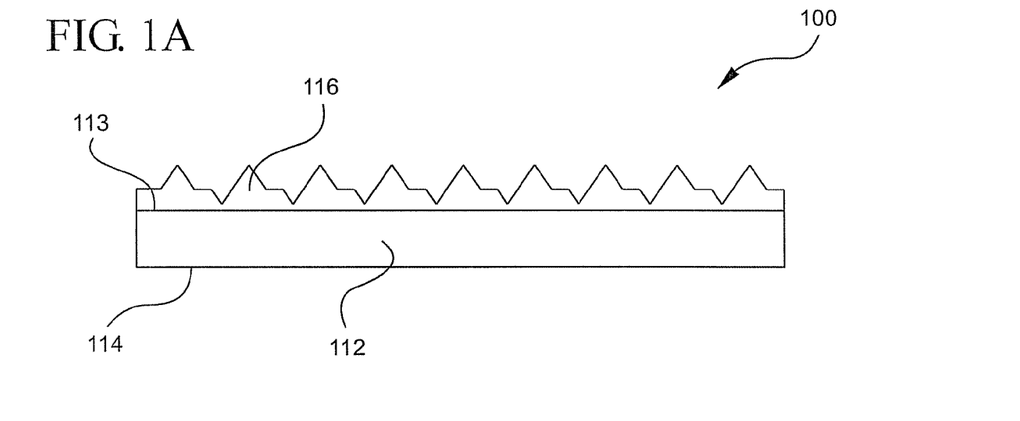
FIGS. 1A-1C are schematic views of exemplary current collectors according to various embodiments.
Figure 1B:
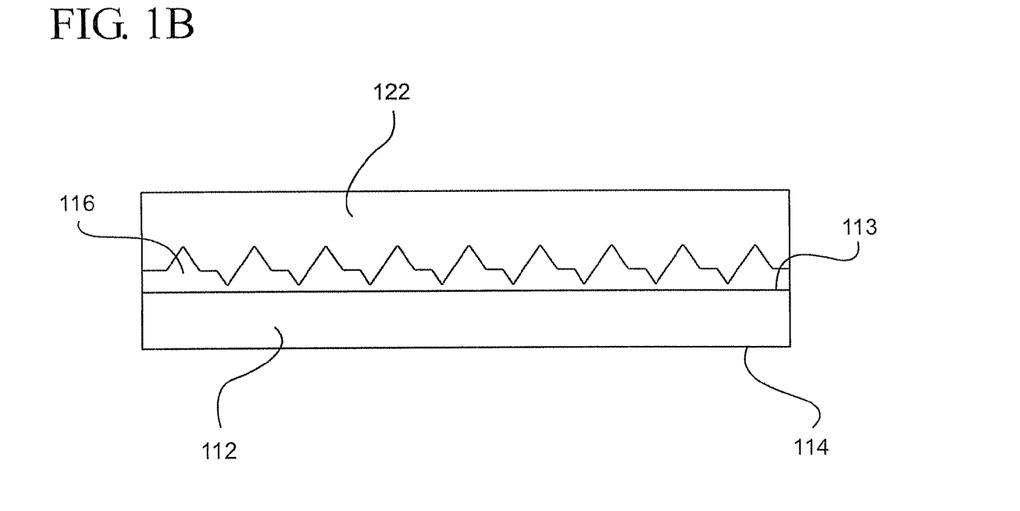
Figure 1C:
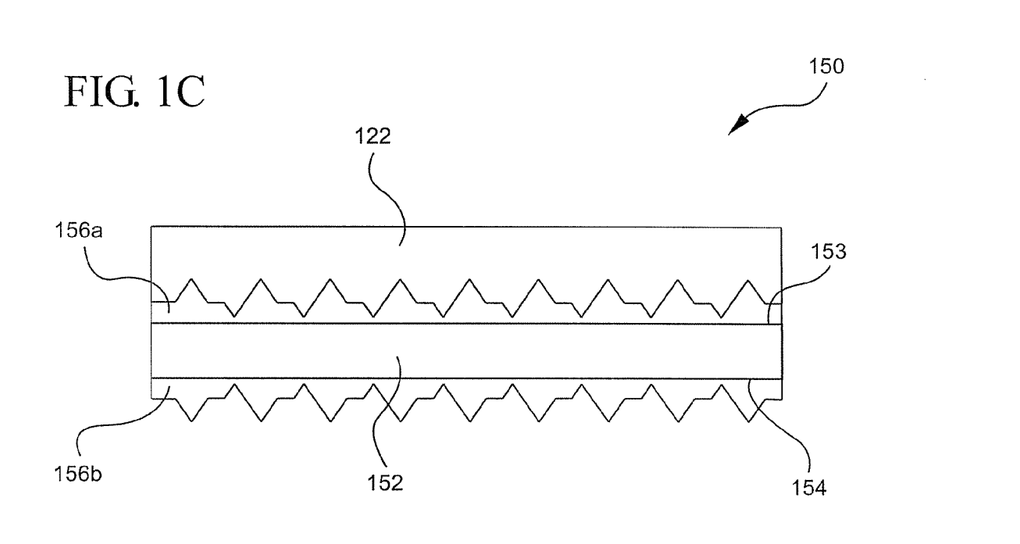

Exemplary current collectors are shown schematically in FIGS. 1A-1C. FIG. 1A depicts a current collector 100. The current collector 100 includes a conductive layer 112 having an electrode-facing surface 113 and a second, opposing surface 114. A textured coating 116 is formed over the electrode-facing surface 113. The textured coating 116 can cover at least a majority of the area of the electrode-facing surface 113. In embodiments, the textured coating 116 can cover substantially all of the electrode-facing surface 113.

In embodiments, as shown in FIG. 1B, the conductive layer 112 and the textured coating 116 are configured so that the textured coating 116 directly contacts an electrode 122. In embodiments, the electrode 122 is formed over and in substantially continuous physical contact with the textured coating 116.

FIG. 1C shows an exemplary current collector 150 according to a further embodiment. The current collector 150 includes a conductive layer 152 having an electrode-facing surface 153 and a second, opposing surface 154. In the FIG. 1C embodiment, a first textured coating 156a is formed over the electrode-facing surface 153, and a second textured coating 156b is formed over the opposing surface 154. The first textured coating 156a can be present on at least a majority of the electrode-facing surface 153, and the second textured coating 156b can be present on at least a majority of the opposing surface 154. Electrode 122 is formed over and in substantially continuous physical contact with the first textured coating 156a.

The conductive layer 112, 152 can generally be made of any conductive material. In embodiments, the conductive layer 112, 152 can be made of a conductive metallic material such as a conductive metal foil. Specific exemplary metallic materials include, for example, platinum, aluminum, copper, nickel, stainless steel, as well as alloys and combinations thereof.

In embodiments where a device has more than one current collector, each conductive layer can be made of the same material or from different materials. In embodiments, an average thickness of a conductive layer can range from about 5 μm to 100 μm (e.g., from about 15 μm to 35 μm, such as about 25 μm).

Formed over at least one surface of a conductive layer is a textured coating having at least one peak and at least one valley. In embodiments, a textured coating can include a plurality of peaks and valleys. A peak can be described as a portion of the coating that has a thickness that is greater than the average thickness of the textured coating, while a valley can be described as a portion of the coating that has a thickness that is less than the average thickness of the textured coating. Thus, peaks will generally correspond to thicker parts of the textured coating, and valleys will correspond to thinner parts of the textured coating.

By configuring the textured coatings to include both peaks and valleys, the textured coatings can provide a balance between the advantages and disadvantages of thick and thin coatings that are non-textured (i.e., smooth coatings). For instance, if a non-textured coating between the electrode and the current collector is too thin, the current collector can be directly exposed (e.g., through pinholes in the coating) to the electrolyte within the device. This could lead to corrosion of the current collector, which could result in undesirable electrochemical reactions. On the other hand, if a non-textured coating between the electrode and the current collector is too thick, the ESR of the overall device increases, which results in an undesirable decrease in the packing efficiency of the device. A textured coating can provide a balance between these two extremes by, in essence, combining features of thin and thick non-textured coatings into a single coating.

The valleys of a textured coating can be advantageous because they can allow particles, such as activated carbon particles within the electrode, to directly impinge upon the conductive layer and make an electrical connection between the electrode and the current collector. The peaks and valleys together can be advantageous because they can cooperate to increase the surface area (e.g., contact area) between the electrode and the conductive layer, which can enhance the adhesion between the two respective surfaces thereby increasing the mechanical stability and contributing to the thermal robustness of the device.

In embodiments, a textured coating includes peaks and valleys each having an average height (i.e., local thickness). In addition to the height of respective peaks and valleys, it should be noted that a textured coating can have an overall average thickness as well. In embodiments, the textured coating can have an average thickness of at least about 1 μm (e.g., 2 to 5 μm). Such an average thickness range can provide a good compromise between ESR increases and packing efficiency.

Figure 2:
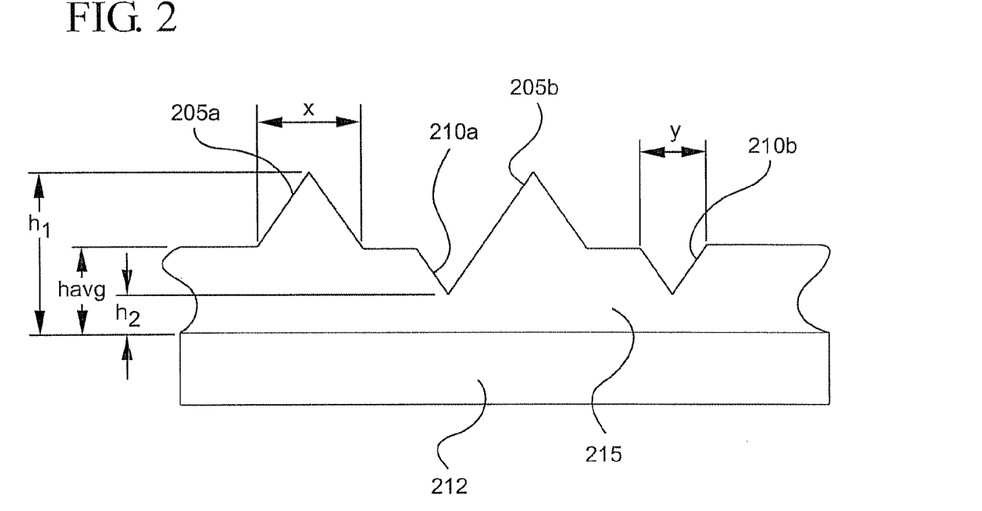
FIG. 2 is a schematic depiction of a portion of a textured coating according to embodiments of the disclosure.

Each peak height will be greater than the average thickness of the textured coating, and each valley height will be less than the average thickness of the textured coating. Thicknesses within the textured coating can be measured directly or determined empirically. FIG. 2 illustrates an exemplary textured coating 215 on a conductive layer 212. Two peaks 205a, 205b and two valleys 210a, 210b are shown. The peak 205a has a height h1 and a length x. The valley 210b has a height h2 and a length y. The average thickness of the textured coating 215 is havg. As seen, peaks 205a and 205b have a greater height (h1) than the average height (havg), and valleys 210a and 210b have a lesser height (h2) than the average height (havg).

In embodiments, the peaks can have an average height of about 5 μm to 20 μm (e.g., from about 5 μm to 10 μm). In embodiments the valleys can have an average height of about 0.3 μm to 3 μm (e.g., from about 0.3 μm to 2 μm, about 1 μm to 3 μm, or about 2 μm to 3 μm).

In embodiments, the average peak height is at least 150% of (e.g., at least 1.5× or 2× greater than) an average thickness of the textured coating. In further embodiments, the average valley height is less than 75% of (e.g., less than half of) the average thickness of the textured coating. In embodiments, the average peak height is at least about two times (e.g., at least 3×, 5×, 10× or 40×) the average valley height.

A textured coating can be characterized by quantifying the relative fraction of the coating area that comprises peaks and/or valleys. An exemplary textured coating includes 100% peaks and valleys. In embodiments, the textured coating includes from about 30% to 70% of the area covered by peaks, and from about 70% to 30% of the area covered by valleys. In embodiments, the textured coating includes about 60% valleys and 40% peaks.

Referring again to FIG. 2, the fraction of peak area and valley area in the textured coating 215 can be estimated from the peak and valley lengths along one dimension. Specifically, the fraction of peaks can be determined by dividing the combined length (x) of all the peaks by the sum of the combined lengths of peaks and the combined lengths of valleys. Similarly, the fraction of valleys can be determined by dividing the combined length (y) of all the valleys by the sum of the combined lengths of peaks and the combined lengths of valleys. In these calculations, the contribution from non-peaks and non-valleys is ignored.

The textured coating can include a pattern of peaks and/or valleys or can have peaks and/or valleys randomly or irregularly distributed over the textured coating. Exemplary patterns include ribbed patterns, diamond patterns, cross-hatched patterns, dot-containing patterns, dimple-containing patterns, zig-zag patterns, spiral patterns, circular patterns, square patterns, triangular patterns, hexagonal patterns, rectangular patterns, or combinations thereof. Generally, patterned coatings can be made as known by one of skill in the art. A random or irregular pattern can be created, for example by blowing air along the surface of a recently-formed coating.

The textured coatings of the present disclosure can be readily distinguished from non-textured coatings by virtue of the regular or irregular distribution of peaks and valleys formed in a surface of the textured coating. Similarly, the textured coatings can be distinguished from coatings that merely possess surface roughness due to, for example, the presence of particles within the coating material. In the present disclosure, the textured coatings are formed by externally manipulating the material that forms the coating to impart peaks and valleys in the coating surface, and not by internally manipulating the coating material by incorporating second phase particles within the coating material that manifest as surface roughness.

A textured coating can be formed from a material that is electrically conductive or electrically insulating. In embodiments, an electrically-conductive material, if used, has a resistance of less than about 50 ohms/sq at 25 μm dry thickness.

In embodiments, a conductivity promoter can be incorporated into a textured coating. A conductivity promoter can render an otherwise electrically insulating material electrically conductive. Exemplary conductivity promoters can include conductive materials such as carbon black, natural or artificial graphite, graphitic carbon, carbon nanotubes, carbon nanowires, metal fibers, metal nanowires, and combinations thereof.

A textured coating can comprise a polymeric component and a conductivity promoter. An example of a polymeric component is a polymeric binder such as carboxymethyl cellulose, polytetrafluoroethylene, polyvinyl alcohol rubberized polymer and polyvinyl pyrrolidone. The polymeric component and conductivity promoter can be mixed from separate components or obtained as a commercially-available mixture. An example of a commercially-available composition that includes a polymeric component and a conductivity promoter includes DAG® EB-012, DAG® EB-023, or DAG® EB-815, which are marketed by Acheson Industries, Inc. (Madison Heights, Mich.).

A textured coating can be formed using known methods such as gravure coating methods, slot die coating methods, spray coating methods, dip coating methods, screen-printing methods, ink-jet printing methods, and tape casting methods. A textured coating can be formed directly on a suitable conductive layer, or formed on an alternate substrate and transferred to a suitable conductive layer.

Advantageously, in contrast to previously-utilized coatings that often required conditioning of the conductive layer (e.g., cleaning and/or etching) prior to forming a textured coating thereon, it is not necessary to pre-treat the conductive layer. Disclosed methods of forming current collectors containing textured coatings do not require any pre-processing steps.

Once a coating material is applied to the conductive layer, it can be cured. The curing conditions can depend at least in part on the composition of the coating material. In some embodiments, curing can be accomplished by drying the coating at room temperature. In alternative embodiments, curing can be accomplished by heating at higher temperatures. In embodiments, curing can be carried out by heating the coated conductive layer in an oven at a suitable temperature, for example, 100° C.

A current collector comprising a conductive layer and a textured coating can be characterized by a thru-plane area-specific resistance. Thru-plane area-specific resistance measurements can be accomplished as known by those of skill in the art. An exemplary measurement method is described in Example 1. The effect of the current collector on the overall power density of a device that includes the current collector can be determined from the measured resistance.

The incorporation of a textured coating into a current collector can lower the interfacial resistance between the current collector and the active material (electrode), and thus improve the efficiency of a device comprising the current collector. Notably, lowering the interfacial resistance of the current collector/electrode interface will lower the ESR of the device, which in turn will increase its power density. Thus, the textured coating can enable the production of high energy density and high power density devices.

The textured coatings can also improve the high temperature stability of the current collector and the resulting device. Stability at higher temperatures means that the current collector can be exposed to higher temperatures during fabrication. This allows, for example, the materials making up the device to be dried at higher temperatures before the final device is assembled. Higher temperature drying can promote long term stability of the device by minimizing the presence of adsorbed water, which can have a detrimental effect on device performance.

An exemplary device that can benefit from the use of current collectors comprising textured coatings is an electric double layer capacitor (EDLC). EDLCs are also referred to as ultracapacitors. In embodiments, an EDLC can include two current collectors, where each current collector is associated with a respective electrode. The two electrodes are separated by a porous separator, and an electrolyte solution is incorporated throughout the electrodes and the separator. When an electric potential is applied to the EDLC, ionic current flows due to the attraction of anions to the positive electrode and cations to the negative electrode. The ionic current flow generates an electric charge that is stored at the interface between each polarized electrode and the electrolyte solution.

The particular design of an EDLC can vary depending on the intended application and can include, for example, jelly roll or cylindrical designs, prismatic designs, honeycomb designs, hybrid or pseudo-capacitive designs, supercapacitor or ultracapacitor type designs, and other designs known in the art.

Figure 3A:
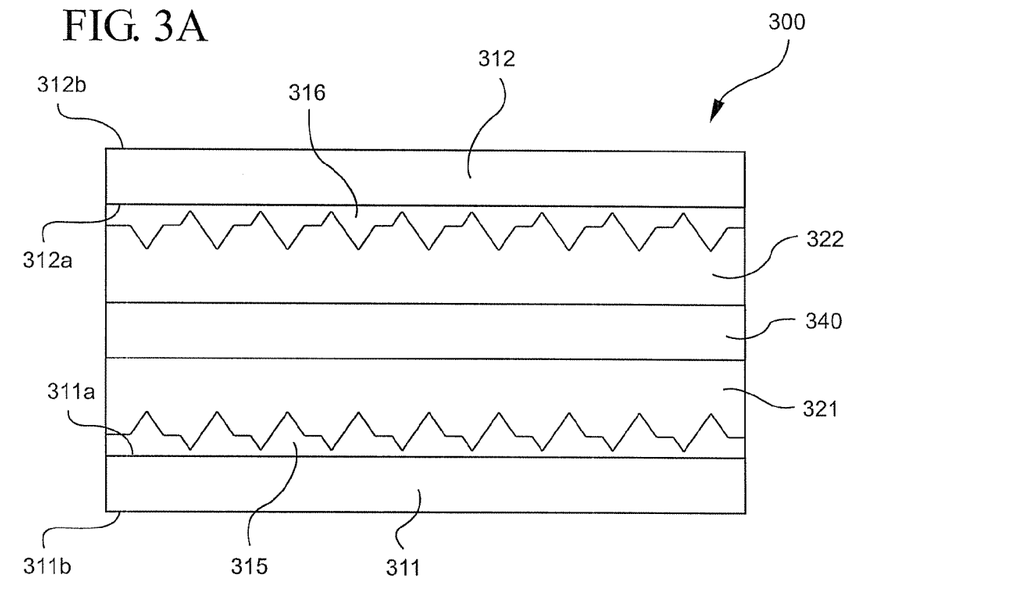
FIGS. 3A and 3B are schematic views of electric double layer capacitors (EDLCs) according to embodiments of the disclosure.

FIG. 3A depicts an arrangement of elements in an exemplary EDLC assembly. The device assembly 300 includes a first electrode 321 and a second electrode 322. A separator 340 is disposed between the first electrode 321 and the second electrode 322. In embodiments, the separator 340 physically contacts both the first electrode 321 and the second electrode 322. The separator 340 is generally a porous, insulating material that is not reactive with an electrolyte, and is relatively thin in order to minimize the internal resistance of the resulting device. Exemplary materials that can be used to form the separator include cloth, non-woven material; or porous bodies made of glass fibers, polyethylene, polypropylene, and/or cellulose. In embodiments, cellulose paper may be used.

First conductive layer 311 and second conductive layer 312 are proximate to the first electrode 321 and the second electrode 322, respectively. Each conductive layer has a pair of opposing surfaces, an electrode-facing surface 311a and 312a, and a second surface 311b and 312b. As shown in FIG. 3A, a first textured coating 315 is formed over and in contact with the electrode-facing surface 311a of the first conductive layer 311, and a second textured coating 316 is formed over and in contact with the electrode-facing surface 311b of the second conductive layer 312. In embodiments, the first textured coating 315 covers at least a majority of the electrode-facing surface 311a of the first conductive layer 311, and the second textured coating 316 covers at least a majority of the electrode-facing surface 312a of the second conductive layer 312. Each electrode 321, 322 is in substantially continuous physical contact with a respective textured coating 315, 316. Located between and in contact with each of the first and second electrodes 321, 322 is a separator 340. As described further hereinafter, an electrolyte can be incorporated throughout both the electrodes 321, 322 and the separator 340.

Figure 3B:
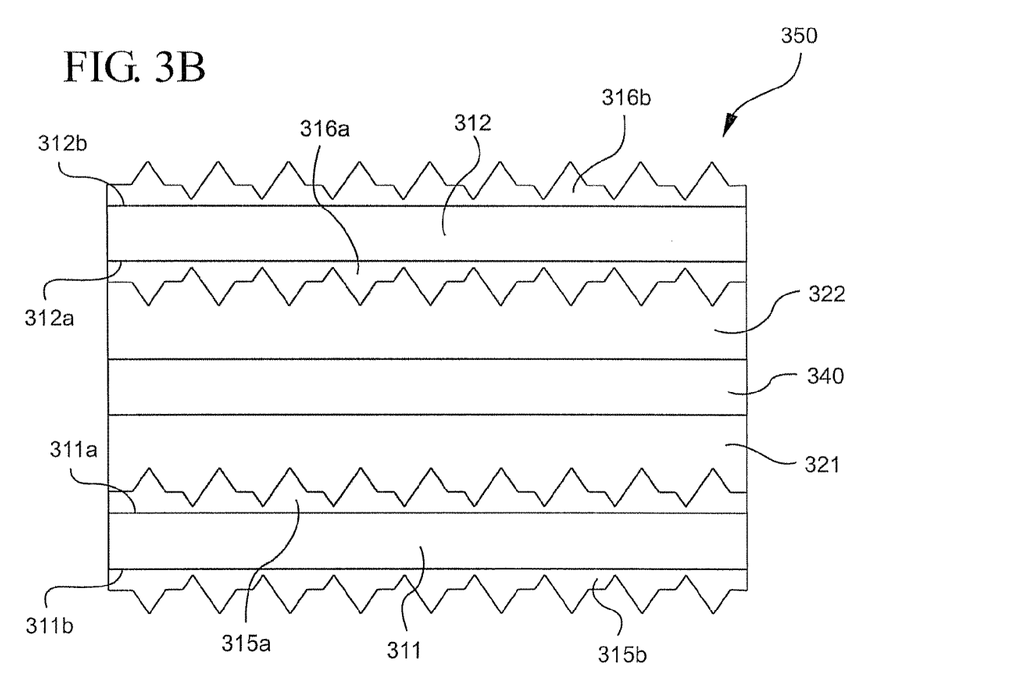

FIG. 3B depicts the arrangement of elements in a further exemplary EDLC assembly. In FIG. 3B, device assembly 350 includes the components discussed above with respect to FIG. 3. Textured coatings 315a and 316a are formed over the electrode-facing surfaces of the first and second conductive layers 311, 312. In addition, textured coatings 315b and 316b are formed over the second surfaces 311b, 312b of the respective conductive layers. In embodiments, each of the textured coatings 315a, 315b, 316a and 316b covers a majority of the respective conductive layer surface.

The first electrode 321 and the second electrode 322 are generally porous electrodes, and can be formed from the same or different materials. For instance, either or both of the first electrode 321 and the second electrode 322 can include carbon. In embodiments, both the first electrode 321 and the second electrode 322 comprise activated carbon. An electrode that comprises a majority (by weight) activated carbon is referred to herein as an activated carbon electrode. In embodiments, one or both of the first and second electrodes can be an activated carbon electrode.

One form of activated carbon that can be used to form an electrode such as an activated carbon electrode can have a relatively high surface area. Activated carbon having a relatively high surface area can enable a device with a relatively high energy density. In embodiments, the activated carbon can have a surface area of at least about 100 m$^2$/g (e.g., at least about 1000 m$^2$/g or at least about 1500 m$^2$/g).

Specific examples of activated carbon include coconut shell-based activated carbon, petroleum coke-based activated carbon, pitch-based activated carbon, polyvinylidene chloride-based activated carbon, polyacene-based activated carbon, phenolic resin-based activated carbon, polyacrylonitrile-based activated carbon, activated carbon from natural sources such as coal or charcoal, and activated carbon from other natural organic sources. In embodiments, an electrode can include a majority of activated carbon (e.g., greater than about 50, 60, 70, 80 or 90% by weight activated carbon). An electrode can include from about 80% to about 95% by weight activated carbon.

Optionally, an electrode can include one or more binders. Binders can provide mechanical stability by, for example, promoting cohesion in otherwise loosely assembled particulate materials. Exemplary binders include polymers, co-polymers, or other high molecular weight substances capable of binding activated carbon and other optional components. Specific exemplary binders include polytetrafluoroethylene (PTFE), polyvinylidene fluoride, or other fluoropolymer particles, thermoplastic resins such as polypropylene, or polyethylene, rubber-based binders such as styrene-butadiene rubber (SBR), and combinations thereof. In embodiments, PTFE or fibrillated PTFE can be used as a binder.

The content of binder can be determined by a skilled artisan, but can include, for example between about 5 to 20% by weight (e.g., about 10 or 15% by weight). In embodiments, an electrode can include up to about 20% by weight of binder (e.g., up to about 10, 15 or 20% by weight).

An electrode can optionally include one or more conductivity promoters. Exemplary conductivity promoters can include conductive materials such as carbon black, natural or artificial graphite, graphitic carbon, carbon nanotubes, carbon nanowires, metal fibers, metal nanowires, and combinations thereof.

In embodiments, carbon black can be used as a conductivity promoter. In embodiments, an electrode can include up to about 10% by weight (e.g., from about 1 to 10%) of one or more conductivity promoters. An exemplary electrode can include about 5% by weight of a conductivity promoter.

In embodiments, one or more electrodes can include activated carbon, a conductivity promoter and a binder. For example, an electrode can include from about 80% to 95% by weight of activated carbon, from about 1% to 10% by weight of conductivity promoter, and from about 5% to 15% by weight of binder. One such electrode can include about 85% by weight activated carbon, about 5% by weight conductivity promoter, and about 10% by weight binder. An exemplary electrode can include about 85% by weight activated carbon, about 5% by weight carbon black, and about 10% by weight fibrillated PTFE. In embodiments, both the first electrode and the second electrode can include these (or other) relative amounts of components.

Electrodes can be formed using known methods and techniques. An exemplary method of forming an electrode utilizes a composition containing the components of the electrode (for example, activated carbon, a conductivity promoter, and a binder). The composition is mixed with a solvent to form a slurry or paste, which can then be formed (via pressure, for example) into a desired structure. Once formed into the desired structure, the electrode can be dried at a suitable temperature in order to remove residual solvent and/or water. The drying temperature can depend at least in part on the identity of the solvent and the materials making up the electrode. In embodiments, electrodes can be dried at a temperature of at least about 100° C. (e.g., at least about 150° C.) for at period of time ranging from about 8 to 16 hours.

In embodiments, an electrode can be formed from a paste containing the desired components (activated carbon, conductivity promoter and binder). Shear pressure and compaction force via calendaring or rolling can then be utilized to form sheets of the paste. Exemplary sheets can be about 5 mils thick (0.005") for example. The electrode so formed can then be combined with the other components of the device. An exemplary method of fabricating electrodes that include activated carbon can be found in commonly-assigned United States Patent Application Publication No. 2009/0109599, the disclosure of which is incorporated herein by reference.

A method of forming a textured coating on a conductive layer and a method of incorporating an electrode on a surface of the textured coating include lamination. An electrode material can be laminated, for example, to a surface of a textured coating that has been previously laminated to a conductive layer. Lamination can be accomplished as known to those of skill in the art. Exemplary conditions can include lamination at about 200° C. at a pressure of about 150 to 500 pli (pounds per linear inch) by use of a calendering machine. The applied pressure can enhance certain advantages of a textured coating by accommodating or causing activated carbon (from the electrode) to impinge into the textured coating and/or the conductive layer. A structure comprising an electrode, textured coating, and conductive layer is referred to herein as an electrode/current collector assembly.

An EDLC assembly can be formed by incorporating a separator with two or more electrode/current collector assemblies. Thus, one example of an EDLC assembly includes a conductive layer/textured coating/electrode/separator/electrode/textured coating/conductive layer. Once formed, an EDLC assembly can be heated to remove any adsorbed water. A step of heating an EDLC assembly can be carried out at a temperature of at least about 100° C. (e.g., at least about 120° C.).

As noted above, operable device include an electrolyte. The electrolyte can be a liquid that is incorporated throughout the first electrode 321, the second electrode 322, and the separator 340. Liquid electrolyte can be incorporated throughout the electrodes and separator by soaking these structures in the electrolyte.

Any generally utilized electrolyte materials can be used. Electrolytes are generally good ionic conductors. Exemplary electrolytes include one or more salts dissolved in a suitable solvent. Exemplary salts include, for example, tetraethylammonium tetrafluoroborate (TEABF$_4$), triethylmethylammonium tetrafluoroborate (TEMABF$_4$), hexafluorophosphate (LiPF$_6$), lithium tetrafluoroborate (LiBF$_4$), lithium hexafluoroarsenate (LiAsF$_6$), lithium perchlorate (LiClO$_4$), lithium triflate (LiCF$_3$SO$_3$), lithium bis(trifluoromethanesulfone)imide (LiN(SO$_2$CF$_3$)$_2$), lithium bis(perfluoroethylsulfonyl)imide (LiN(SO$_2$CF$_2$CF$_3$)$_2$), and combinations thereof.

The electrolyte solvent is one that can dissolve the salt and which does not detrimentally affect the electrodes, the separator, or other packaging materials. In embodiments, solvents that can be used include organic solvents such as non-aqueous organic solvents, or aprotic organic solvents. Examples of solvents include water, acetonitrile, 1,3-dioxolane, ethylene carbonate, propylene carbonate, butylene carbonate, dimethyl carbonate, diethyl carbonate, ethylmethyl carbonate, dimethoxyethane, propylmethyl carbonate, and combinations thereof. In embodiments, acetonitrile, propylene carbonate, ethylene carbonate, dimethyl carbonate, and mixtures thereof.

The electrolyte can have any useful concentration of salt. In embodiments, the salt has a concentration of at least about 0.5 M in the electrolyte (e.g., at least about 1.0 M, such as about 0.5 M to 2.0 M).

An electrolyte can be added to an EDLC assembly to form a functional EDLC device. The electrolyte can be loaded into the EDLC assembly using known techniques. Exemplary methods include, for example, vacuum filling or gravity filling. The EDLC device, once electrolyte has been added, can be sealed in order to maintain the electrolyte within the device. Sealing the device can be accomplished using methods known to those of skill in the art.

For high power applications, a large number of individual EDLCs can be connected in series to boost the output voltage. To accomplish this, individual EDLC devices can be formed into multi-cell stacks, packs, battery, or series of cells. An EDLC pack refers to a device that includes a plurality of EDLC devices or structures.

The specific size and geometry of an array of EDLCs can vary depending on the intended application. Exemplary configurations are known to those of skill in the art and any such configurations can be used with EDLC devices disclosed herein. In embodiments, a pack can be a two-dimensional array of EDLCs comprising 2, 3, 4, 5, 10, 20 or more individual devices, or a plurality of EDLCs arranged in single or multiple rows. In embodiments, an EDLC pack can be a three-dimensional array of groups of EDLCs that include multiple two-dimensional arrays of the same or varying geometries. In embodiments, a particular configuration that is utilized can be chosen to maximize the energy per unit volume of the EDLC pack. An exemplary configuration for a multi-cell pack can be found in US Patent Application Publication No. 2009/0109600, the disclosure of which is incorporated by reference herein.

EDLC devices and cells as disclosed herein can be utilized for numerous different applications, including applications where pulsed power is needed. Exemplary applications range from small size devices such as cell phones, to large size devices such as hybrid vehicles.

The textured coatings disclosed herein can also be advantageously implemented in high power batteries with lithium ion phosphate and lithium titanium oxide electrode materials. Current collectors can include metals such as aluminum and copper, particularly in lithium ion batteries.

Example 1

Measurement of Thru-Plane Area-Specific Resistance of an Aluminum Conductive Layer with Textured Coating 1 mil thick aluminum foil (1145 H19) that had not been cleaned or treated was fed into a roll-to-roll Gravure impression printing unit at a 30° angle, 70 pli (lines or rows of cells per linear inch) and 30 bcm (billion cubic micron). DAG® EB-012 (Acheson Industries, Inc., Madison Heights, Mich.) was coated onto one side of the aluminum foil. The coated side of the foil was dried using an IR heat lamp for about 2 seconds, and then the foil was re-spooled onto the printing unit. The uncoated side of the foil was coated and dried in the same fashion. This formed a current collector with a textured coating having a ribbed pattern on both sides. The coated current collector was then placed in a 100° C. oven for at least 10 minutes before further processing. The textured coating had approximately 60% valleys and 40% peaks based on a visual estimate of the sample and a photo of the sample. The approximate thickness of the valleys were between 0.3 and 3 µm, and the approximate thickness of the peaks were from 5 to 10 µm as determined from a cross sectional scanning electron micrograph of the coating.

Activated carbon electrodes were made as follows. A 85:5 (by weight) mixture was prepared comprising YP50F activated carbon (Kuraray Chemical Co., LTD, Osaka, Japan) and BLACK PEARLS® 2000 carbon black (Cabot Corporation, Boston, Mass.). Polytetrafluoroethylene (PTFE) was added to make a composition having a final composition of 85:5:10 (by weight) of activated carbon:carbon black:PTFE. 1 part of this mixture was added to 2.6 parts by weight isopropyl alcohol. The mixture was thoroughly mixed and allowed to semi-dry in an oven. The semi-dried material was then pre-formed into a sheet about 10 mil thick, and densified into a 5 mil sheet by systematic rolling.

Two activated carbon electrodes (prepared as above) were hot laminated at 200° C. at a minimum of 150 pounds per linear inch (pli) on both sides of the above-formed current collector with the textured coating. The thru-plane area-specific resistance of this structure was then measured as described below.

Figure 4:
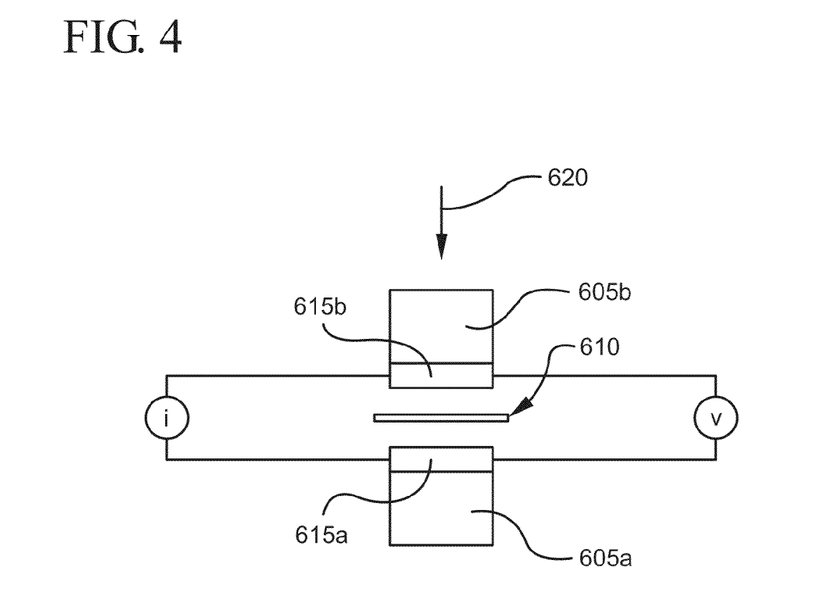
FIG. 4 is a schematic illustration of an experimental setup for measuring thru-plane area-specific resistance.

A 1 3/16 inch disc was punched out of the laminated structure. An Instron 4202 Table Top Electromechanical Test System (Instron Corp., Canton, Mass.) (FIG. 4) was set up with the sample. A 100 lb controlled load (as indicated by the arrow at 620) was applied to sample 610, which was positioned between two ceramic cylinders 605a and 605b. Each ceramic cylinder had a diameter of about 1 inch and was covered where it made contact with the sample 610 by silver foil contacts 615a and 615b. Direct current (DC) four wire resistance measurements were made using a Keithley 2700 multimeter (Keithley Instruments, Inc., Cleveland, Ohio) and resistance values were then calculated for area-specific resistance. The results are shown in Table 1.

Once the thru-plane area-specific resistance of the sample was measured, the entire sample was then placed in an oven at about 150° C. for about 16 hours. The sample was allowed to cool and then the thru-plane area-specific resistance was measured again. The results are shown in Table 1.

Comparative Example 1

A commercially available current collector manufactured by Exopack, LLC (Spartanburg, S.C.) was laminated at room temperature on both sides with an activated carbon electrode that was prepared as described in Example 1. The thru-plane area-specific resistance was measured before and after exposure to 150° C. for 16 hours. These results for a comparative sample are shown in Table 1.

The aluminum foil current collector in Example 1 and Comparative Example 1 have the same thickness and composition, and the activated carbon electrodes were prepared in the same fashion. These controlled features allows a comparison of the textured coating of Example 1 with the smooth coating of the Exopack current collector (Comparative Example 1).

Example 2

Figure 5:
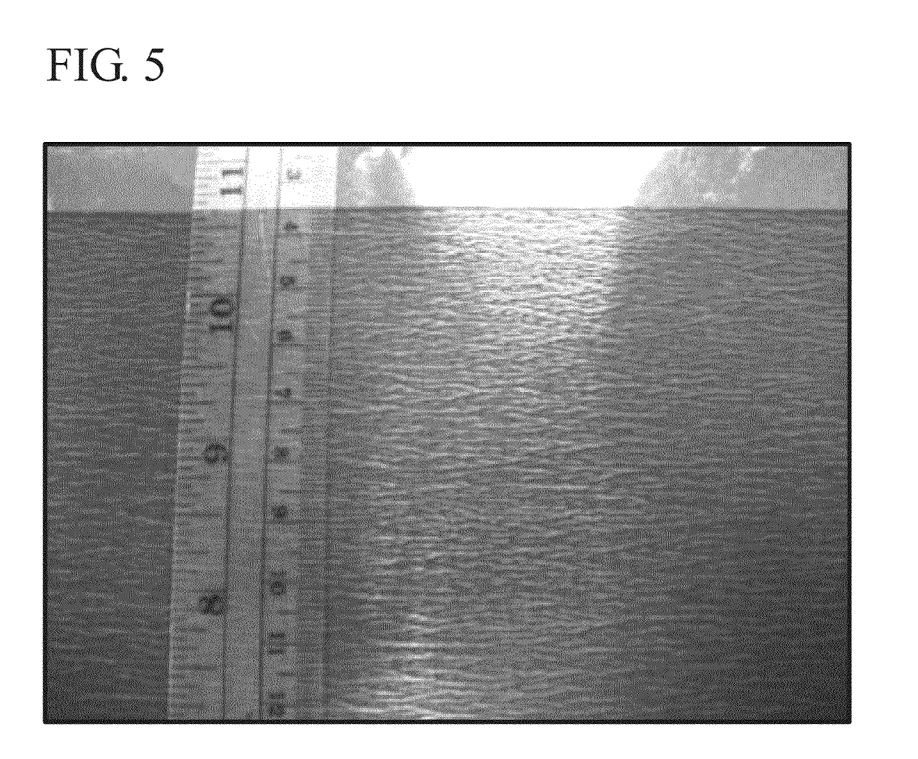
FIG. 5 is an optical photograph of a textured coating.

An aluminum current collector with a textured coating was prepared as in Example 1 with the exception that the Gravure impression coater was set at 180 pli and 16 bcm. A coating having a diamond-shaped pattern on both sides was formed. A picture of one surface of the current collector with the textured coating can be seen at FIG. 5. The textured coating had approximately 40% valleys and 60% peaks based on visual estimates of the sample and the photo. The approximate thickness of the valleys ranged from about 0.5 to 3 μm, and the approximate thickness of the peaks ranged from about 8 to 13 μm as determined from a cross sectional scanning electron microscope image.

The thru-plane area-specific resistance was measured as described in Example 1 before and after exposure to 150° C. for 16 hours. The results can be seen in Table 1. The thru-plane area-specific resistance was less than the target value of 0.25 ohm-cm² or less.

Comparative Examples 2, 3 and 4

In order to determine the effects of the maximum valley thickness on the thru-plane area-specific resistance, three aluminum current collectors (1145 H19) were dip-coated with conductive coatings of different thicknesses (as received DAG® EB-012 (Acheson Industries, Inc., Madison Heights, Mich.)), and the thru-plane area-specific resistance was measured before and after exposure to elevated temperatures.

Comparative Example 2 was an aluminum current collector that was coated once to a total thickness of approximately 3 μm. Comparative Example 3 was an aluminum current collector that was coated twice to a total thickness of approximately 4 μm. Comparative Example 4 was an aluminum current collector that was coated three times to a total thickness of approximately 8 μm. The coated current collectors were laminated with activated carbon electrodes as described in Example 1.

The thru-plane area-specific resistance was measured as described in Example 1 above before and after exposure to 150° C. for 16 hours. The results for Comparative Examples 2-4 are shown in Table 1.

TABLE 1

| Example | Thru-plane area-specific resistance, as made [ohm-cm²] | Thru-plane area-specific resistance, after heating at 150° C. [ohm-cm²] | Coating Topography and Thickness |
| --- | --- | --- | --- |
| Example 1 | 0.16 ± 0.01 | 0.15 ± 0.01 | 40% Peaks: 5-10 μm<br>60% Valleys: 0.5-3 μm |
| Comparative Example 1 | 0.25 ± 0.01 | 0.90 ± 0.15 | Smooth<br>2-3 μm |
| Example 2 | 0.09 ± 0.01 | 0.23 ± 0.01 | 60% Peaks: 8-13 μm<br>40% Valleys: 0.5-3 μm |
| Comparative Example 2 | 0.17 ± 0.07 | 0.15 ± 0.08 | Smooth<br>2.5-3 μm |
| Comparative Example 3 | 0.23 ± 0.08 | 0.16 ± 0.08 | Smooth<br>3.4-4.4 μm |
| Comparative Example 4 | 0.82 ± 0.15 | 1.32 ± 0.80 | Smooth<br>7-8.2 μm |

The embodiments described above as well as other embodiments are within the scope of the following claims. One skilled in the art will appreciate that the present disclosure can be practiced in embodiments other than those disclosed. The disclosed embodiments are presented for purposes of illustration and not limitation.

What is claimed is:

1. An electrode assembly comprising:
a current collector comprising a conductive layer having an electrode-facing surface and an opposing second surface, each surface having an area;
a textured coating formed over and in contact with substantially all of the area of the electrode-facing surface; and
an electrode in physical contact with the textured coating,
wherein the textured coating comprises peaks having an average height ranging from about 5 micrometers to about 13 micrometers and covering from about 40% to about 60% of the area of the electrode-facing surface,
wherein the textured coating comprises valleys having an average height ranging from about 0.5 micrometers to about 3 micrometers and covering from about 40% to about 60% of the area of the electrode-facing surface, and
wherein the electrode assembly has a thru-plane area-specific resistance less than or equal to about 0.25 ohm-cm².

2. The electrode assembly of claim 1, wherein the conductive layer comprises a metal selected from the group consisting of platinum, aluminum, copper, nickel, stainless steel, and combinations thereof.

3. The electrode assembly of claim 1, wherein the conductive layer is a foil layer having an average thickness of less than about 0.5 mm.

4. The electrode assembly of claim 1, wherein the textured coating comprises a conductive material.

5. The electrode assembly of claim 1, wherein the textured coating comprises carbon black, natural graphite, artificial graphite, graphitic carbon, carbon nanotubes, carbon nanowires, metal fibers, metal nanowires, and combinations thereof.

6. The electrode assembly of claim 1, wherein the textured coating has an average thickness of at least about 1 micrometer.

7. The electrode assembly of claim 1, wherein a ratio of average peak height to average valley height is at least about 3.

8. The electrode assembly of claim 1, wherein the textured coating comprises a patterned surface.

9. The electrode assembly of claim 8, wherein the patterned surface comprises an array of ribs, diamonds, cross-hatches, dots, dimples, zig-zags, spirals, circles, squares, triangles, hexagons, rectangles, and combinations thereof.

10. The electrode assembly of claim 1, further comprising a second textured coating formed over and in contact with the second surface of the conductive layer.

11. The electrode assembly of claim 1, wherein the electrode assembly has a thru-plane area-specific resistance ranging from about 0.09 ohm-cm² to about 0.23 ohm-cm².

12. A method of forming an electrode assembly, the method comprising:

forming a textured coating over and in contact with substantially all of an electrode-facing surface of a conductive layer, and forming a first electrode over and in substantially continuous physical contact with the textured coating, wherein the textured coating comprises peaks having an average height ranging from about 5 micrometers to about 13 micrometers and covering from about 40% to about 60% of the electrode-facing surface, wherein the textured coating comprises valleys having an average height ranging from about 0.5 micrometers to about 3 micrometers and covering from about 40% to about 60% of the electrode-facing surface, and wherein the electrode assembly has a thru-plane area-specific resistance less than or equal to about 0.25 ohm-cm$^2$.

13. The method of claim 12, wherein the conductive layer is a foil layer having an average thickness of less than about 0.5 mm.

14. The method of claim 12, wherein the textured coating is formed using a method selected from the group consisting of gravure coating, slot die coating, spray coating, screen-printing, ink-jet printing, tape-casting, and combinations thereof.

15. The method of claim 12, wherein the textured coating has an average thickness of at least about 1 micrometer, and a ratio of average peak height to average valley height of at least about 3.

16. The method of claim 12, wherein the electrode is laminated over the textured coating.

17. The method of claim 12, further comprising forming a textured coating on a second surface of the conductive layer.

18. The method of claim 12, wherein the electrode assembly has a thru-plane area-specific resistance ranging from about 0.09 ohm-cm$^2$ to about 0.23 ohm-cm$^2$.

19. A method of forming an electric double layer capacitor assembly comprising:

(a) producing a first electrode assembly by:
  forming a first textured coating over and in physical contact with at least a majority of an electrode-facing surface of a first conductive layer; and
  forming a first electrode over and in substantially continuous physical contact with the first textured coating;

(b) producing a second electrode assembly by:
  forming a second textured coating over and in physical contact with at least a majority of an electrode-facing surface of a second conductive layer; and
  forming a second electrode over and in substantially continuous physical contact with the second textured coating;

(c) placing the first and second electrodes in physical contact with the separator layer to form the electric double layer capacitor assembly, wherein at least one of the first or second textured coatings comprises peaks and valleys, the peaks having an average height ranging from about 5 micrometers to about 13 micrometers and covering from about 40% to about 60% of the first or second electrode-facing surface, and the valleys having an average height ranging from about 0.5 micrometers to about 3 micrometers and covering from about 40% to about 60% of the first or second electrode-facing surface, and wherein at least one of the first or second electrode assemblies has a thru-plane area-specific resistance less than or equal to about 0.25 ohm-cm$^2$.

20. An electric double layer capacitor comprising:
a first electrode assembly comprising a first conductive layer in electrical contact with a first electrode;
a second electrode assembly comprising a second conductive layer in electrical contact with a second electrode;
a separator positioned between and in physical contact with the first and second electrodes; and
an electrolyte incorporated throughout the first electrode, the second electrode, and the separator,
wherein at least one of the first or second electrode assemblies further comprises:
  a textured coating formed over and in contact with substantially all of an electrode-facing surface of the first or second conductive layer, the textured coating comprising peaks and valleys, wherein the peaks have an average height ranging from about 5 micrometers to about 13 micrometers and cover from about 40% to about 60% of the first or second electrode-facing surface, and wherein the valleys have an average height ranging from about 0.5 micrometers to about 3 micrometers and cover from about 40% to about 60% of the first or second electrode-facing surface, and
  a thru-plane area-specific resistance less than or equal to about 0.25 ohm-cm$^2$.

21. The electric double layer capacitor of claim 20, wherein the first or second conductive layer comprises a metal selected from the group consisting of platinum, aluminum, copper, nickel, stainless steel, and combinations thereof.

22. The electric double layer capacitor of claim 20, wherein the first or second conductive layer is a foil layer having an average thickness of less than about 0.5 mm.

23. The electric double layer capacitor of claim 20, wherein the first or second textured coating comprises a conductive material.

24. The electric double layer capacitor of claim 20, wherein the first or second textured coating comprises carbon black, natural graphite, artificial graphite, graphitic carbon, carbon nanotubes, carbon nanowires, metal fibers, metal nanowires, and combinations thereof.

25. The electric double layer capacitor of claim 20, wherein the first or second textured coating has an average thickness of at least about 1 micrometer.

26. The electric double layer capacitor of claim 20, wherein the peaks have an average height of about 5 micrometers to 10 micrometers, and the valleys have an average height of about 1 micrometer to 3 micrometers.

27. The electric double layer capacitor of claim 20, wherein the thru-plane area-specific resistance ranges from about 0.09 to about 0.23 ohm-cm$^2$.

\* \* \* \* \*